(12) United States Patent
Que et al.

(10) Patent No.: US 10,210,034 B2
(45) Date of Patent: Feb. 19, 2019

(54) ELECTRONIC DEVICE WITH RECORDING FUNCTIONALITY AND METHOD FOR RECORDING THEREOF

(71) Applicant: VIA ALLIANCE SEMICONDUCTOR CO., LTD., Shanghai (CN)

(72) Inventors: Heng Que, Shanghai (CN); Quanquan Xu, Shanghai (CN); Deming Gu, Shanghai (CN); Yuanfeng Wang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 93 days.

(21) Appl. No.: 15/270,921

(22) Filed: Sep. 20, 2016

(65) Prior Publication Data
US 2017/0147426 A1 May 25, 2017

(30) Foreign Application Priority Data

Nov. 23, 2015 (CN) .......................... 2015 1 0821659

(51) Int. Cl.
*G06F 11/07* (2006.01)
(52) U.S. Cl.
CPC ...... *G06F 11/0778* (2013.01); *G06F 11/0706* (2013.01); *G06F 11/079* (2013.01); *G06F 11/0751* (2013.01)

(58) Field of Classification Search
CPC . G06F 11/0778; G06F 11/079; G06F 11/0706
See application file for complete search history.

(56) References Cited

U.S. PATENT DOCUMENTS

| | | | | |
|---|---|---|---|---|
| 7,536,584 B2 * | 5/2009 | Davies | ................ | G06F 11/0727 714/5.11 |
| 7,702,955 B2 * | 4/2010 | de Almeida | ........ | G06F 11/1441 714/10 |
| 7,809,992 B2 * | 10/2010 | Kulidjian | ............ | G06F 11/0757 713/340 |

(Continued)

*Primary Examiner* — Nadeem Iqbal
(74) *Attorney, Agent, or Firm* — McClure, Qualey & Rodack, LLP

(57) ABSTRACT

An electronic device, for integration with functional circuit modules, includes gates, monitor module, signal control module and record module. The functional modules are operated on clock signal for generating request instruction and response signal. The gate is coupled to the functional modules for transmitting request instruction and response signal to functional module on enable signals. The monitor module is coupled to the functional modules and the gates for generating hold signal. The monitor module generates enable signals on finish signal. The clock signal control module coupled to the functional modules and the monitor module for outputs main clock signal to generate clock signals. The clock signal control module generates record instruction and stop clock signals, and the clock signal control module re-outputs clock signals on finish signal. The record module coupled to the functional modules and the clock signal control module begins to record request instruction and response signal when receiving record instruction.

8 Claims, 2 Drawing Sheets

(56) References Cited

U.S. PATENT DOCUMENTS

| | | | |
|---|---|---|---|
| 7,913,113 B2* | 3/2011 | Gunabalasubramaniam | G06F 11/1417 714/15 |
| 8,065,569 B2* | 11/2011 | Kawamura | G06F 11/0748 714/48 |
| 8,984,220 B1* | 3/2015 | Gill | H04L 41/046 711/114 |
| 9,965,200 B1* | 5/2018 | Gill | H04L 41/046 |
| 2011/0035624 A1* | 2/2011 | Miller | G06F 11/0793 714/15 |
| 2013/0024721 A1* | 1/2013 | Kabulepa | G06F 11/1641 714/5.1 |

* cited by examiner

ELECTRONIC DEVICE WITH RECORDING FUNCTIONALITY AND METHOD FOR RECORDING THEREOF

CROSS-REFERENCE TO RELATED APPLICATIONS

This non-provisional application claims priority under 35 U.S.C. § 119(a) on Patent Application No(s). 201510821659.8 filed in China on Nov. 23, 2015, the entire contents of which are hereby incorporated by reference.

TECHNICAL FIELD

The present disclosure provides an electronic device with recording functionality and a method for recording, more particular to an electronic device recoverable from system malfunctions and a method for recording the system state of the electronic device.

BACKGROUND

An electronic system may malfunction during the operation of the system. In order to reduce the possibility of the system malfunction in the electronic system, some manufacturers use simulation software or simulation systems to imitate the operation of a real electronic device. However, the simulation is only capable of finding out the problems that the manufacturers assume. Some problems and malfunctions in the real electronic system are still unable to be predicted by the simulation.

Recently, some electronic systems or devices have been equipped with a member for providing an infrastructure for debugging the system in the electronic device such as debug bus, debug register and scan chain. However, this member for debugging is merely capable of recording a system state when the electronic device malfunctions, but is incapable of recording the system state before the system malfunction happens, and thereby it is unfavorable for finding the root cause of the malfunction.

SUMMARY

According to the disclosure, an electronic device integrated with a first functional module and a second functional module includes a request gate, a response gate, a monitor module, a clock signal control module and a record module. The first functional module is operated based on a first clock signal for generating a request instruction. The second functional module is operated based on a second clock signal for receiving the request instruction and generating a response signal corresponding to the request instruction. The request gate is coupled to the first functional module and the second functional module for allowing the request instruction to be transmitted to the second functional module based on a request enable signal. The response gate is coupled to the first functional module and the second functional module for allowing the response signal to be transmitted to the first functional module based on a response enable signal. The monitor module is coupled to the first functional module, the second functional module, the request gate and the response gate for generating a hold signal based on at least one of the request instruction and the response signal. The monitor module generates the request enable signal or the response enable signal based on a finish signal. The clock signal control module is coupled to the first functional module, the second functional module and the monitor module for outputting a main clock signal to generate at least one of the first clock signals and the second clock signal. The clock signal control module is configured to generate a record instruction and stopping outputting the first clock signal and the second clock signal based on the hold signal, and the clock signal control module is configured to re-output the first clock signal and the second clock signal based on the finish signal. The record module is coupled to the first functional module, the second functional module and the clock signal control module. The record module begins to record the request instruction and the response signal when receiving the record instruction, and the record module generates the finish signal when finishing recording the request instruction and the response signal.

BRIEF DESCRIPTION OF THE DRAWINGS

The present invention will become more understood from the detailed description given herein below and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
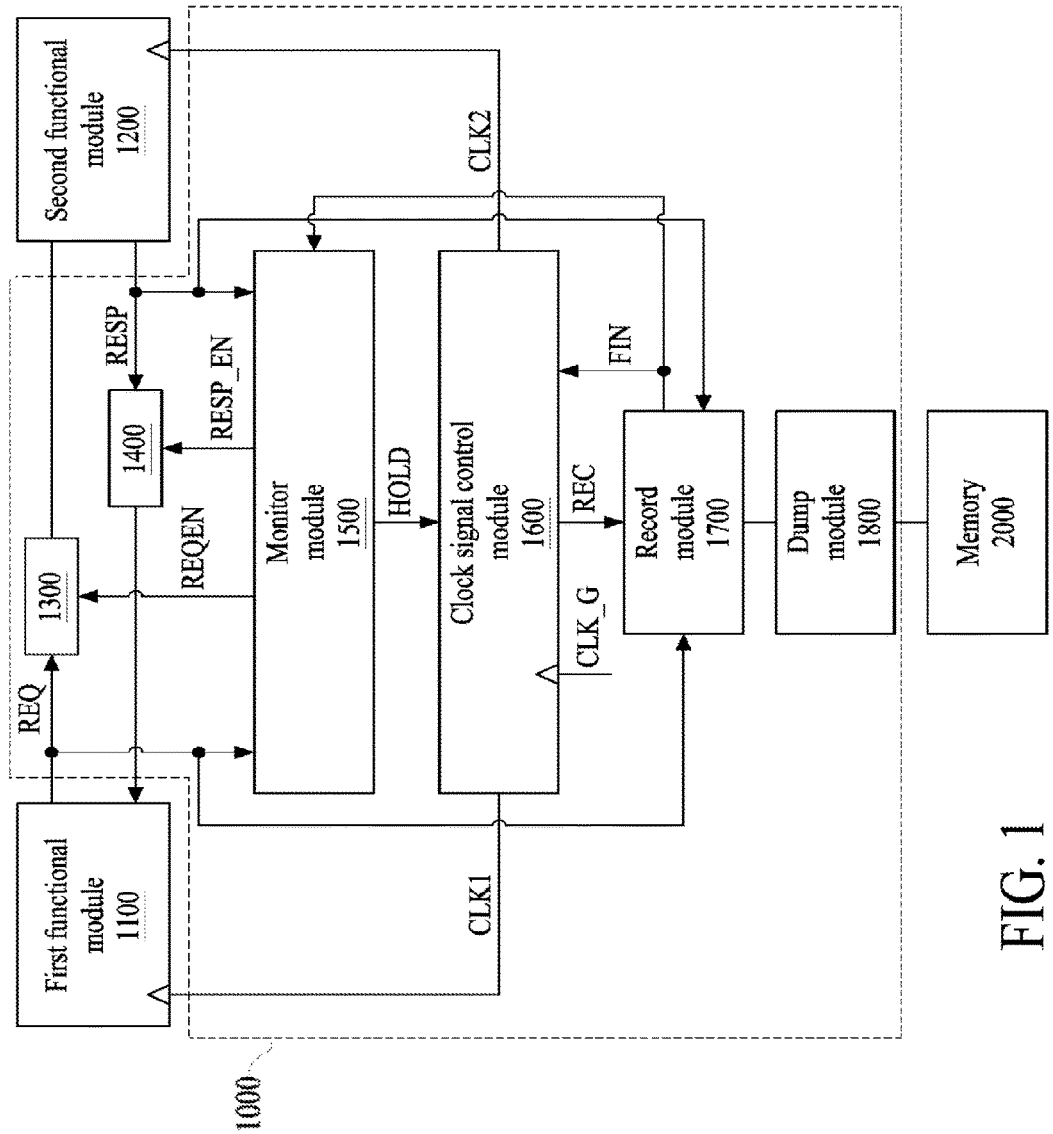
FIG. 1 is a block diagram of modules of an electronic device according to an embodiment.

Please refer to FIG. 1. FIG. 1 is a block diagram of modules of an electronic device according to an embodiment. In this embodiment, the electronic device 1000 is designed to integrate with a first functional module 1100 and a second functional module 1200 and the electronic device includes a request gate 1300, a response gate 1400, a monitor module 1500, a clock signal control module 1600 and a record module 1700. The request gate 1300 and the response gate 1400 may be coupled to the first functional module 1100 and the second functional module 1200. The monitor module 1500 may be coupled to the first functional module 1100, the second functional module 1200, the request gate 1300 and the response gate 1400. The clock signal control module 1600 may be coupled to the first functional module 1100, the second functional module 1200 and the monitor module 1500. The record module 1700 may be coupled to the monitor module 1500 and the clock signal control module 1600.

The first functional module 1100 is operated based on a first clock signal CLK1 for generating a request instruction REQ. The second functional module 1200 is operated based on the second clock signal CLK2 for receiving the request instruction REQ and generating a response signal RESP corresponding to the request instruction REQ. In this embodiment, the response signal RESP generated from the second functional module 1200 may be the information for informing the first functional module 1100 that whether the second functional module 1200 receives the request instruction REQ or not. In some embodiments, the response signal RESP generated from the second functional module 1200 may be the information requested by the request instruction REQ.

The request gate 1300 is for allowing the request instruction REQ to be transmitted to the second functional module 1200 based on a request enable signal REQ_EN. The response gate 1400 is for allowing the response signal RESP to be transmitted to the first functional module 1100 based on a response enable signal RESP_EN. In this embodiment, the request instruction REQ may be a serial signal or a parallel signal.

When the request instruction REQ is a serial signal, a logical value of a bit may be transmitted in each period of the clock signal. The request gate 1300 may include an AND gate. A first input end of the AND gate may be coupled to the first functional module 110 for receiving the request instruction REQ. A second input end of the AND gate may be for receiving the request enable signal REQ_EN. When the logical value of the request enable signal REQ_EN is true, a signal output from the AND gate is equal to the request instruction REQ. When the logical value of the request enable signal REQ_EN is false, the logical value of the signal output from the AND gate is also false.

When the request instruction REQ is a parallel signal, plural logical values of N bits may be transmitted in each period of the clock signal, wherein N is positive integer. The request gate 1300 may include a total of N AND gates. Each of the first input ends of the AND gates may be coupled to the first functional module 1100 for receiving the logical value of one of the N bits in the request instruction REQ, and the second input ends of the AND gates may be for receiving the request enable signal REQ_EN.

Moreover, the response signal RESP may be a serial signal or a parallel signal. When the response signal RESP is a serial signal, a logical value of a bit may be transmitted in each period of the clock signal. The response gate 1400 may include an AND gate. A first input end of the AND gate may be coupled to the second functional module 1200 for receiving the response signal RESP. A second input end of the AND gate may be for receiving the response enable signal RESP_EN. When the logical value of the response enable signal RESP_EN is true, a signal output from the AND gate is equal to the response signal RESP. When the logical value of the response enable signal RESP_EN is false, the logical value of the signal output from the AND gate is also false.

When the response signal RESP is a parallel signal, plural logical values of N bits may be transmitted in each period of the clock signal, wherein N is positive integer. Thus, the response gate 1400 may include N AND gates. Each of the first input ends of the AND gates may be coupled to the second functional module 1200 for receiving the logical value of one of the N bits in the response signal RESP, and the second input ends of the AND gates may be for receiving the response enable signal RESP_EN.

The monitor module 1500 is for generating a hold signal HOLD based on at least one of the request instruction REQ and the response signal RESP, and the monitor module 1500 generates the request enable signal REQ_EN or the response enable signal RESP_EN based on a finish signal FIN. In this embodiment, when the monitor module 1500 detects that the first functional module 1100 generates the request instruction REQ or the second functional module 1200 generates the response signal RESP, the monitor module 1500 generates the hold signal HOLD and transmits the hold signal HOLD to the clock signal control module 1600.

The clock signal control module 1600 is for outputting a main clock signal CLK_G to generate at least one of the first clock signal CLK1 and the second clock signal CLK2. When the clock signal control module 1600 receives the hold signal HOLD, the clock signal control module 1600 may generate a record instruction REC and transmit the record instruction REC to the record module 1700, and the clock signal control module 1600 may stop outputting the first clock signal CLK1 and the second clock signal CLK2. The clock signal control module 1600 may re-output the first clock signal CLK1 and the second clock signal CLK2 based on the finish signal FIN transmitted from the record module 1700.

When the record module 1700 receives the record instruction REC, the record module 1700 may begin to record the request instruction REQ and the response signal RESP. When record module 1700 finishes recording the request instruction REQ and the response signal RESP, the record module 1700 may generate the finish signal FIN. When the request instruction REQ is parallel signal, the record module 1700 may duplicate the bits of the request instruction REQ in a queue, and then generate the finish signal FIN. When the clock signal module 1600 and the monitor module 1500 receives the finish signal FIN from the record module 1700, the clock signal module 1600 and the monitor module 1500 may control the first functional module 1100 and the second functional module 1200 to keep executing the interaction between the first functional module 1100 and the second functional module 1200 such as signal handshaking, data calculation and system operation. Next, the record module 1700 may read the request instruction REQ duplicated in the queue in sequence. The interaction between the first functional module 1100 and the second functional module 1200 may be paused for a short time when the queue is not full. When the queue is full, the record module 1700 may remove the saved logical values and duplicate new bits of the request instruction REQ in the queue until all of the bits of the request instruction REQ are duplicated in the queue, and then the record module 1700 generates and transmits the finish signal FIN.

In detail, in this embodiment, the record module 1700 may include a request record unit, a response record unit and a logic gate. The request record unit may be coupled to the first functional module 1100 and the clock signal control module 1600. When the request record unit receives the record instruction REC, the request record unit may begin to record the request instruction REQ. When the request record unit finishes recording the request instruction REQ, the request record unit may generate a first finish signal. The response record unit may be coupled to the second functional module 1200 and the clock signal control module 1600. When the response record unit receives record instruction REC, the response record unit may begin to record the response signal RESP. When the response record unit finishes recording the response signal RESP, the response record unit may generate a second finish signal. The logic gate may be coupled to the request record unit, the response record unit and the clock signal control module 1600 for generating the finish signal FIN based on the first finish signal and the second finish signal. In other words, both the request record unit and the response record unit can be the queue mentioned above.

Figure 2:
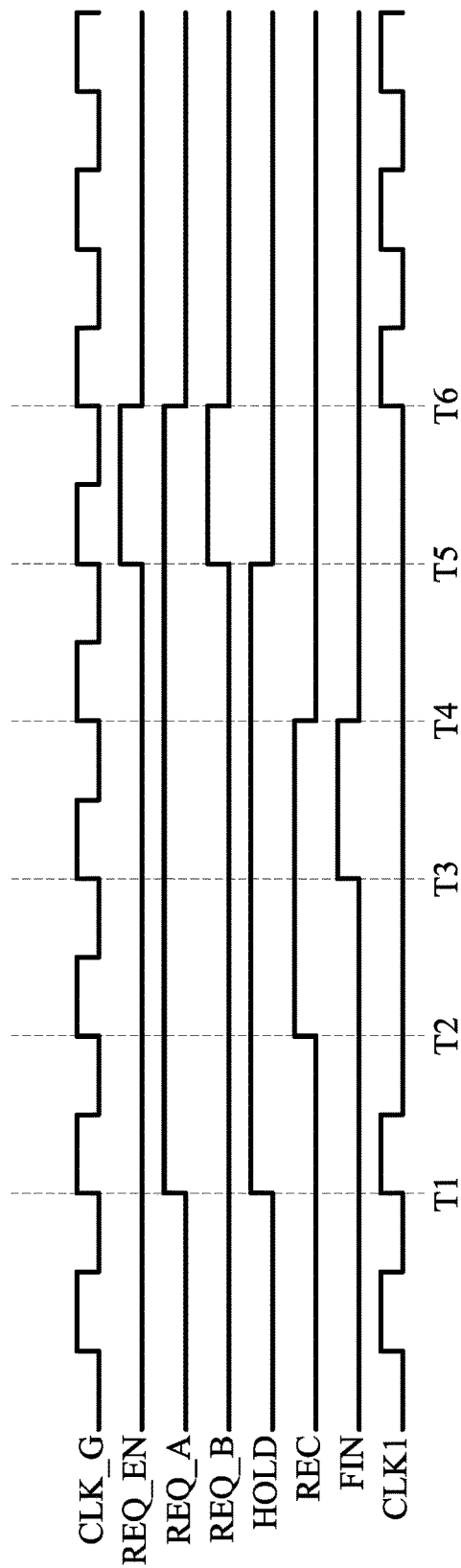
FIG. 2 is a signal-timing diagram corresponding to the first functional module and the second functional module in FIG. 1.

The temporal relationships among the aforementioned signals are illustrated hereafter. Please refer to FIG. 2. FIG. 2 is a signal-timing diagram corresponding to the first functional module and the second functional module in FIG. 1. The request enable signal REQ_EN and the response enable signal RESP_EN are normally shifted to low logic level so that both the request gate 1300 and the response gate 1400 are normally closed. That is, a signal channel between the first functional module 1100 and the second functional module 1200 is temporarily closed. The hold signal HOLD is normally shifted to low logic level but not paused. The finish signal FIN is normally shifted to low logic level. In FIG. 2, a signal REQ_A represents the request instruction REQ transmitted from the first functional module 1100, and a signal REQ_B represents the request instruction REQ received by the second functional module 1200. At a time point T1, the signal REQ_A is shifted to high logic level, which means that the first functional module 1100 transmits the request instruction REQ. Simultaneously, the hold signal HOLD is shifted to high logic level so that the first clock signal CLK1 is kept at low logic level. At a time point T2, the clock signal control module 1600 shifts the record instruction REC to high logic level so as to inform the record module 1700 to begin recording the request instruction REQ. At a time point T3, the record module 1700 finishes recording the request instruction REQ and shifts the finish signal FIN to high logic level so as to inform each modules that the request instruction REQ has been totally recorded. At a time point T4, the record instruction REC and the finish signal FIN are shifted to low logic level. At a time point T5, the hold signal HOLD is shifted to lower logic level, and the request enable signal REQ_EN is shifted to high logic level. In addition, the signal REQ_B is also shifted to high logic level at the time point T5, which means that the second functional module 1200 receives the request instruction REQ. At a time point T6, the first clock signal CLK1 is re-output from the clock signal control module 1600 to the first functional module 1100. In this embodiment, when the first clock signal CLK1 is kept at a specific logic level, the second clock signal CLK2 and other clock signals generated by the functional modules are also kept at a specific logic level.

In this embodiment, the electronic device 1000 may further interface with a third functional module (not shown in the drawings). When one of the first functional modules 1100, the second functional module 1200 and the third functional module transmits an instruction or a signal, the monitor module 1500 transmits the hold signal HOLD for preventing asynchrony among the three functional modules. The electronic device 1000 includes two or three functional modules in this embodiment, but the disclosure is not limited thereto. It is obvious to a person having ordinary skill in the art that the electronic device 1000 may include more than three functional modules.

In this embodiment, the electronic device 1000 may further include a dump module 1800. The dump module 1800 may be coupled to the record module 1700 and a memory 2000 located outside of the electronic device 1000. The dump module 1800 is for saving at least one of the request instruction REQ and the response signal RESP to the memory 2000. That is, the dump module 1800 may used for saving the record of the signal handshaking between the first functional module 1100 and the second functional module 1200 in the record module 1700 to the memory 2000, and thereby the record of the signal handshaking saved to the memory 2000 can be processed by other electronic members in the same system of the electronic device 1000. Furthermore, it is favorable for increasing an amount of capacity for recording the signal handshaking.

In this embodiment, the signal handshaking recorded on the record module 1700 may comprise a signal, a timestamp and a stamp of the functional module, which generates the signal. The signal may be the request instruction REQ or the response signal RESP recorded on the record module 1700. Therefore, when the electronic device 1000 malfunctions, the electronic device 1000 is capable of being restored in accordance with the signals recorded on the record module 1700 and the memory 2000, and a user is able to check the system states of the modules in the electronic device 1000 before the malfunction happens.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. An electronic device integrated with a first functional module and a second functional module, the first functional module operated based on a first clock signal configured to generate a request instruction, the second functional module operated based on a second clock signal configured to receive the request instruction and generate a response signal in response to the request instruction, the electronic device recording signal communications between the first functional module and the second functional module, the electronic device comprising:

a request gate coupled to the first functional module and the second functional module for allowing the request instruction to be transmitted to the second functional module based on a request enable signal;

a response gate coupled to the first functional module and the second functional module for allowing the response signal to be transmitted to the first functional module based on a response enable signal;

a monitor module coupled to the first functional module, the second functional module, the request gate and the response gate for generating a hold signal based on at least one of the request instruction and the response signal, and the monitor module configured to generate the request enable signal or the response enable signal based on a finish signal;

a clock signal control module coupled to the first functional module, the second functional module and the monitor module, for outputting a main clock signal to generate at least one of the first clock signal and the second clock signal, wherein the clock signal control module is configured to generate a record instruction and stop outputting the first clock signal and the second clock signal based on the hold signal, and the clock signal control module is configured to re-output the first clock signal and the second clock signal based on the finish signal; and a record module coupled to the first functional module, the second functional module and the clock signal control module, wherein the record module begins to record the request instruction and the response signal when receiving the record instruction, and the record module generates the finish signal when finishing recording the request instruction and the response signal;

a dump module coupled to the record module and a memory, the dump module used for saving the request instruction and the response signal to the memory;

wherein when the electronic device malfunctions, the electronic device is capable of being restored by retrieving the request instruction and the response signal recorded on the record module and the memory and restoring the electronic device in accordance therewith, and a user is able to check states of the first functional module and the second functional module before the electronic device malfunctions, by checking the request instruction
and the response signal recorded in the record module and the memory.

2. The electronic device according to claim 1, wherein the record module comprises:
  a request record unit coupled to the first functional module and the clock signal control module, wherein the request record unit begins to record the request instruction when receiving the record instruction, and the request record unit generates a first finish signal when finishing recording the request instruction;
  a response record unit coupled to the second functional module and the clock signal control module, wherein the response record unit begins to record the response signal when receiving the record instruction, and the response record unit generates a second finish signal when finishing recording the response signal; and
  a logic gate coupled to the request record unit, the response record unit and the clock signal control module for generating the finish signal based on the first finish signal and the second finish signal.

3. The electronic device according to claim 1, wherein the request gate comprises an AND gate, a first input end of the AND gate is coupled to the first functional module for receiving the request instruction, a second input end of the AND gate is coupled to the monitor module for receiving the request enable signal, and an output end of the AND gate is coupled to the second functional module.

4. The electronic device according to claim 1, wherein the response gate comprises an AND gate, a first input end of the AND gate is coupled to the second functional module for receiving the response signal, a second input end of the AND gate is coupled to the monitor module for receiving the response enable signal, and an output end of the AND gate is coupled to the first functional module.

5. A method for recording signal communications between a first functional circuit module and a second functional circuit module of an electronic system, and the method comprising steps of:
  executing following steps when the first functional module transmits a request instruction to the second functional module, or alternatively when the second functional module transmits a response signal to the first functional module, comprising:
  temporarily closing a signal channel between the first functional module and the second functional module;
  stopping outputting a first clock signal to the first functional module;
  stopping outputting a second clock signal to the second functional module;
  recording at least one of the request instruction and the response signal; and
  opening the signal channel between the first functional module and the second functional module as well as respectively re-outputting the first clock signal and the second clock signal to the first functional module and the second functional module when at least one of the request instruction and the response signal is recorded;
  saving at least one of the request instruction and the response signal to a memory;
  wherein when the electronic system malfunctions, the electronic system is capable of being restored by retrieving the request instruction and the response signal recorded on the record module and the memory and restoring the electronic system in accordance therewith, and a user is able to check states of the first functional module and the second functional module before the electronic system malfunctions, by checking the request instruction and the response signal recorded in the record module and the memory.

6. The method according to claim 5, wherein
the signal channel comprises a first AND gate and a second AND gate, a first input end of the first AND gate is coupled to the first functional module, a second input end of the first AND gate is configured to receive a request enable signal, and an output end of the first AND gate is coupled to the second functional module;
a first input end of the second AND gate is coupled to the second functional module, a second input end of the second AND gate is configured to receive a response enable signal, and an output end of the second AND gate is coupled to the first functional module;
wherein the step of temporarily closing the signal channel comprises:
  shifting a logic level of the request enable signal and a logic level of the response enable signal to low logic level.

7. The method according to claim 5, wherein the step of recording at least one of the request instruction and the response signal comprises:
  duplicating at least one of the request instruction and the response signal in a queue for reducing time for recording at least one of the request instruction and the response signal.

8. The method according to claim 5, wherein the request instruction which is recorded, comprises a timestamp and a stamp of the first functional module.

* * * * *